United States Patent [19]

Foster, Jr. et al.

[11] 4,370,576
[45] Jan. 25, 1983

[54] ELECTRIC GENERATOR

[75] Inventors: John S. Foster, Jr., Pleasanton; James R. Wilson, Livermore; Charles A. McDonald, Jr., Danville, all of Calif.

[73] Assignee: The United States of America as represented by the United States Department of Energy, Washington, D.C.

[21] Appl. No.: 175,393

[22] Filed: Feb. 21, 1962

[51] Int. Cl.³ .................... H02K 1/00; G21B 1/00; G01R 33/02
[52] U.S. Cl. ........................ 310/10; 336/20; 324/228
[58] Field of Search .............. 340/8; 310/4, 10, 11, 310/300; 102/70.2; 336/20; 324/43, 47; 317/158

[56] References Cited

U.S. PATENT DOCUMENTS

| 3,113,272 | 12/1963 | Cannon et al. | 336/20 |
| 3,356,869 | 12/1967 | Hilton et al. | 310/10 |
| 3,478,231 | 11/1969 | Knoepfel | 310/10 |
| 3,484,627 | 1/1969 | Conger et al. | 310/10 |
| 3,522,459 | 8/1970 | Stuffs et al. | 310/10 |
| 3,564,305 | 2/1971 | Cummings | 310/10 |
| 3,602,808 | 8/1971 | Kirkland | 336/20 |
| 4,252,605 | 2/1981 | Shaffer | 310/10 |

Primary Examiner—Nelson Moskowitz

EXEMPLARY CLAIM

1. In an electrical energy generator, the combination comprising a first elongated annular electrical current conductor having at least one bare surface extending longitudinally and facing radially inwards therein, a second elongated annular electrical current conductor disposed coaxially within said first conductor and having an outer bare surface area extending longitudinally and facing said bare surface of said first conductor, the contiguous coaxial areas of said first and second conductors defining an inductive element, means for applying an electrical current to at least one of said conductors for generating a magnetic field encompassing said inductive element, and explosive charge means disposed concentrically with respect to said conductors including at least the area of said inductive element, said explosive charge means including means disposed to initiate an explosive wave front in said explosive advancing longitudinally along said inductive element, said wave front being effective to progressively deform at least one of said conductors to bring said bare surfaces thereof into electrically conductive contact to progressively reduce the inductance of the inductive element defined by said conductors and transferring explosive energy to said magnetic field effective to generate an electrical potential between undeformed portions of said conductors ahead of said explosive wave front.

14 Claims, 6 Drawing Figures

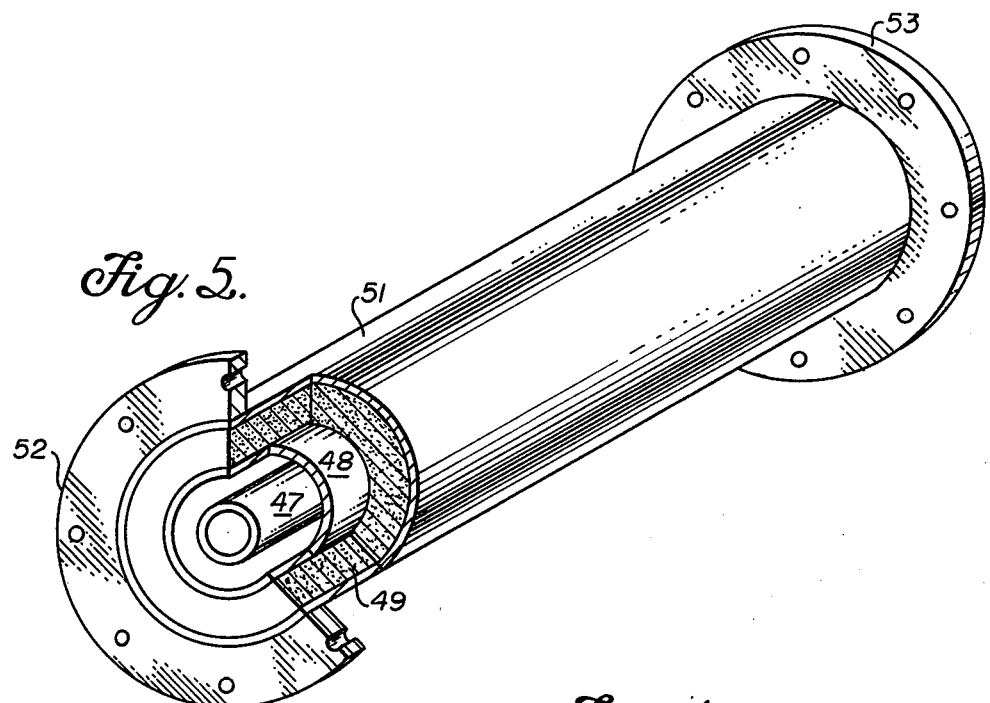
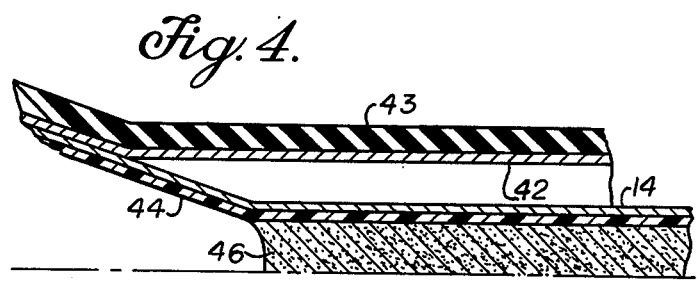
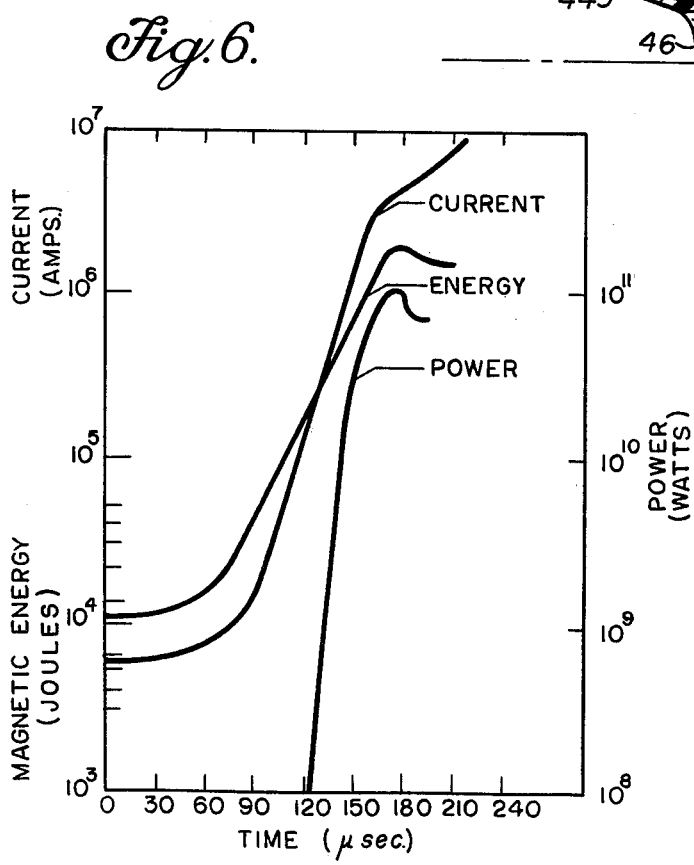

ELECTRIC GENERATOR

The present invention relates to electrical energy and, more particularly, to methods and apparatus for its generation.

The present invention provides methods and apparatus for generating electrical energy in a novel manner. The invention also provides methods and apparatus for generating electrical energy at peak levels never before obtained by man-made structures. While the present invention bears certain similarities to conventional electrical energy generators in the main, the methods and apparatus taught herein are totally novel and may well be the foundation for a new art.

The present invention teaches the use of chemical or nuclear explosives as a driving means for generating electrical energy. Basically, the explosive is used to reduce the inductance of a current-carrying member in such a manner as to give rise to current multiplications of exceptionally high magnitudes. Since the basic source of energy (the chemical or nuclear explosive) from which the electrical energy is obtained is high in energy density, small, compact units for producing large quantities of electrical energy are obtainable. This feature is most important for use in space technology, but also provides advantages for non-space uses. The invention is also capable of being scaled over a wide range. This is to say, that small units (small enough to fit in the hand) can be built for lower energy requirements, while simply increasing the size will give increased output. The upper limit has not yet been determined.

To enable a greater appreciation of the details of the invention, it may be helpful to note some performance values. These values represent the output from a moderate size device and are furnished to indicate possible areas of performance only. A unit six feet long, one foot in diameter and having an 0.6 nanohenry load, supplied a peak current of 70,000,000 amperes, 1,500,000 joules of energy, and nearly $10^{12}$ watts of instantaneous power. Output currents exceeding 250,000,000 amperes have been achieved with larger units. Deliverable energy densities of 1000 joules per cubic centimeter of apparatus are not uncommon to the present invention.

Accordingly, it is an object of the present invention to provide novel methods and apparatus for generating electrical energy.

It is another object of the present invention to provide methods and apparatus for obtaining electrical energy directly from chemical or nuclear explosive energy.

Another object of the present invention is to provide small, portable units capable of generating electrical energies of unprecedented magnitude.

Still another object of the present invention is to provide methods and apparatus for increasing the energy in a current-carrying inductive member by systematically reducing the inductive value of the member.

Another object of the invention is to provide a high energy density system (greater than 100 joules/cc) for generating electrical energy.

In the drawings:

FIG. 4 is a partial, cross-sectional view of a modified embodiment of the present invention which utilizes a coaxial transmission line in place of a coil as the inductive member;

FIG. 5 is a partial, cut-away, perspective view of an embodiment of the present invention operating by implosion rather than explosion; and FIG. 6 is a graph of output characteristics of the generator of the invention.

Figure 1:
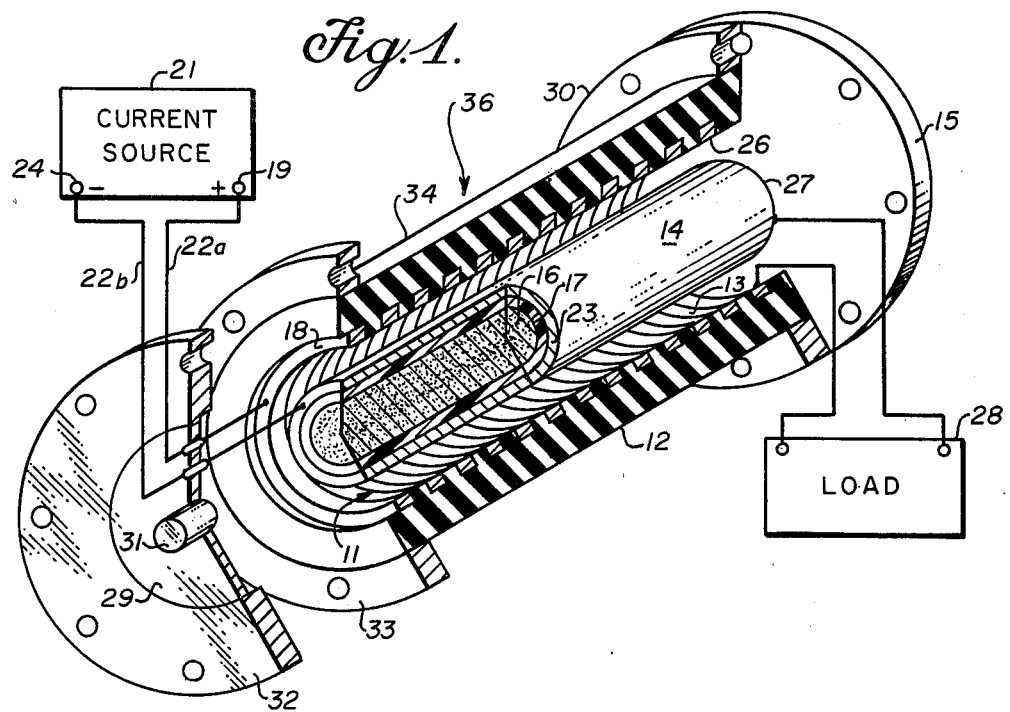
FIG. 1 is a detailed cut-away, perspective illustration of a coil inductive embodiment of the present invention.

Reference to FIG. 1 and a description of the basic embodiment illustrated therein will better enable the understanding of a comprehensive physical analysis (infra) of the phenomena which occur in the operation of the present invention. An electrically conductive coil 11, e.g., copper, forms the inductance, $L_G$, of the generator which is reduced when the generator is operated. Although the physical realization of an inductance is normally thought of as taking the form of a helical coil, a certain amount of inductance is present in any real structure. Thus, the present invention is not restricted to a helical form and, to illustrate this, a generator of the present invention will be shown, infra, which does not utilize a coil as the inductive member. To prevent arcing and other such undesirable effects, the coil 11 is embedded in a nonconducting solid plastic medium 12, such as an epoxy resin. The coil 11 is so embedded in the solid plastic 12 as to have all but its inner surface 13 in intimate contact therewith. An electrically conducting cylinder 14, coaxial with and disposed radially inward of coil 11, is packed with an explosive material 16 and serves as the armature of the generator. The explosive material 16, i.e., HE 16, may be selected from any one of a number of well-known, commercially available, high explosive compositions. Such selection is not particularly critical, so long as the explosive is generally of the "high explosive" type of high power and predictable burning rate. Such explosive compositions as "Comp. B" (60% cyclotrimethylenetrinitramine—40% TNT) and "PBX-9404" (94% tetramethylenetetranitramine—3% tris-β-chloroethyl phosphate—3% nitrocellulose) have been found to be entirely suitable for use in cylinder 14. Cylinder 14 is supported within the generator by means of a non-conducting support member 15 located at the extreme end of the device. Although it is not necessary, armature 14 is generally constructed of the same material as coil 11 and has an inner plastic liner 17 of plastic material contacting its inner surface. Liner 17 serves to insure constant burning of HE 16 by strengthening the armature 14 to prevent the detonated HE from penetrating localized weak areas in the armature. Liner 17 can be excluded, however, by providing close tolerences in the machining operations. Coil 11 is connected at one of its ends 18 to the high potential side 19 of a current source 21, e.g., a small capacitor bank, by means of an electrical conductor 22a. Armature 14 is connected at one of its ends 23 (preferably that end adjacent to end 18 of coil 11) to the low potential side 24 of current source 21 by means of electrical conductor 22b. The other end 26 of coil 11 and the other end 27 of armature 14 serve as terminals between which a load 28 having an inductance, $L_L$, and resistance, $R_L$, is connected. Thus, a complete electrical circuit exists from current source terminal 19 through conductor 22a, through coil 11, through a load 28, back through armature 14, and back to source 21 through conductor 22b.

Load 28, which is generally affixed to a flange 30 and support 15, is shown schematically insomuch as it can take a number of different forms which will be discussed, infra. A disc-shaped end plate 29 having a detonator 31 secured in its center fits over end 18 of coil 11 and end 23 of armature 14, and is secured thereto by means of flange 32 on disc 29 and a flange 33 concentric with outer surface 34 of the generator 36. The detonator makes intimate contact with the HE 16 and serves to initiate the burning thereof.

Figure 2:
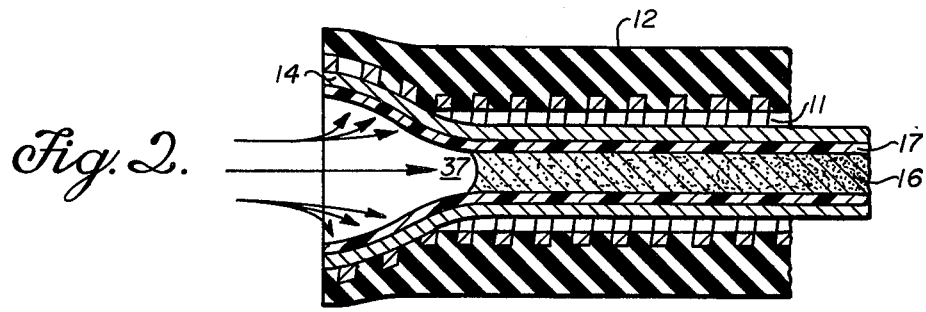
FIG. 2 is a cut-away illustration of the embodiment as shown in FIG. 1 while in operation.

In general, the invention is operated by initially priming the system with an electrical current from source 21. When the desired current level is reached, the HE is ignited by detonator 31, and source 21 is subsequently soon shorted out by the armature 14, contacting the first turn of coil 11. As the HE burns further down the armature 14, the portion of the armature behind the detonation front 37, shown in FIG. 2, is forced radially outward until it makes contact with coil 11, whereupon the contacted turns of the coil 11 are also initially forced radially outward. The portion of the generator directly behind the point of contact between the armature 14 and coil 11 is thereafter generally completely destroyed. Thus, as the high explosive burns, the armature is continuously expanded to progressively contact successive turns of coil 11.

Figure 3:
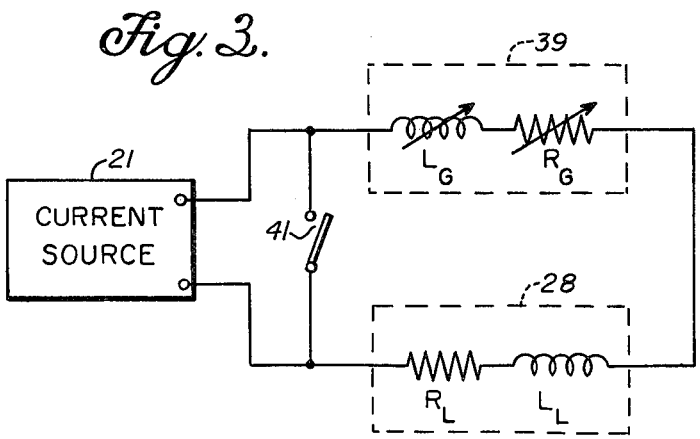
FIG. 3 is a general schematic representation of the electrical circuit of a generator having the essential features shown in FIG. 1.

Referring now to FIG. 3, an electrical circuit of the embodiment shown in FIG. 1 is represented by a generator impedance 39, comprised of a variable inductance, $L_G$, and a variable resistance, $R_G$, in series connection. The load 28 is represented by an inductance, $L_L$, and a resistance, $R_L$, in series connection. The generator impedance 39 and the load impedance 28 are in series connection and supplied with current from source 21 which is connected across the two impedances, 39 and 28. A shorting "switch" 41 is depicted in parallel connection with current source 21 and enables source 21 to be removed from the circuit ("crowbarring" the generator inductance). The switching action of the "switch" 41 occurs when the end 23 of the armature 14 first touches the end 18 of coil 11. An analysis of the circuit using electrical engineering methods furnishes expressions for the current output and energy generated, and enables parameters to be chosen for specific designs.

The equation of the circuit of FIG. 3 after "switch" 41 is closed is $$d/dt(I[L_G+L_L]) + (R_G+R_L)I = 0 \qquad (1)$$

where I is the instantaneous current flowing in the circuit and t is time. It is convenient to rewrite equation (1) in the form $$\frac{\dot{I}}{I} = -\left(\frac{\dot{L}_G}{L_G+L_L}\right) - \left(\frac{R_G+R_L}{L_G+L_L}\right) \qquad (2)$$

where the dot indicates differentiation with respect to time. The solution is $$I = I_o \frac{L_{G_o}+L_L}{L_G+L_L} \exp\left(-\int_o^t \frac{R_G+R_L}{L_G+L_L} dt\right) \qquad (3)$$

where the zero subscript refers to time, t=0. Thus, if there are no losses, the current is inversely proportional to the inductance. Furthermore, losses will be serious whenever the ratio $(R_G+R_L)/(L_G+L_L)$ is of the same order of magnitude as $\dot{I}/I$.

An expression for the stored magnetic field energy $E_M$ is arrived at as follows:

$$E_M = \tfrac{1}{2}(L_G+L_L)I^2 \qquad (4)$$

$$= E_o \frac{L_{G_o}+L_L}{L_G+L_L} \exp\left(-2\int_o^t \frac{R_G+R_L}{L_G+L_L} dt\right)$$

It will be noted, that for sufficiently low resistance circuits, $E_M$ increases. The additional energy is supplied, as in any electrical generator, by the mechanical work done by the armature against the magnetic field. Although the expressions arrived at above give the circuit viewpoint for the general operation of the invention, they fall far short of explaining the basic principles of operation which lead to the real insight of the workings of the invention. To obtain this insight, a physical theory of the present invention is presented below.

The first consideration in setting down a physical theory of the present invention is a discussion of the resistance, $R_G$, and inductance, $L_G$, in terms of more fundamental physical quantities. A basic starting point is with Maxwell's equations (neglecting the displacement current). The displacement current can safely be neglected since the detonation velocity. $v_d$, of high explosives is much less than the velocity of light ($v_d = 8.7 \times 10^5$ cm/sec for PBX 9404, which is $2.9 \times 10^{-5}$ of the velocity of light). Since the armature moves at even somewhat less velocity than this, it can be said that at any instant the entire electrical circuit "knows" the position of the armature; or, in other words, there are no retardation effects.

First considered is a one-dimensional problem where a conductor of resistivity $\eta$ occupies all points of positive x (the "right half-space"), and where the field $B_t(O)$ at x=0 is a boundary condition ($B_t(O)$ is the tangential B field at time O). Then, in rationalized MKS units (to convert to unrationalized emu, $\mu \to 4\pi K_m$ and $B \to H$ throughout; $K_m$ is relative permeability):

$$\nabla \times \overline{B} = \mu \overline{J} \qquad (5)$$

$$\nabla \times \overline{\epsilon} = -\partial \overline{B}/\partial t$$

$$\overline{\epsilon} = \eta \overline{J}$$

where $\overline{J}$ is current density vector, $\overline{\epsilon}$ is electric field vector, $\overline{B}$ is magnetic flux density vector, and $\mu$ is permeability. One can derive for the conductor $$\frac{\partial B}{\partial t} = \frac{\eta}{\mu} \frac{\partial^2 B}{\partial x^2} \qquad (6)$$

where B is the magnitude of the vector $\overline{B}$, which points in the z direction and where $\eta$ is assumed constant.

Mathematically, this is just the equation of heat conduction, and it allows the estimate of the order of magnitude of the skin depth of $\delta$ of the conductor when the multiplication time $\tau$ is known $$\frac{\eta}{\mu} \approx \frac{\delta^2}{\tau}, \delta \approx \sqrt{\frac{\eta}{\mu}\tau} \qquad (7)$$

Since the invention has dimensions of the order of magnitude of length, 1, equal 10 cm, the order of magnitude of $\tau$ in copper is estimated by $1/v_d \approx 12$ μsec $$\delta = \sqrt{\frac{1.7 \times 10^{-8}}{4\pi \times 10^{-7}} \cdot 12 \times 10^{-6}} = 0.0004 \text{ meters}$$

$$\delta \approx 16 \text{ mils}$$

All of the high explosive generators built and tested were designed with coil and armature dimensions considerably thicker than 16 mils. In addition, since all lengths and radii of curvature of surfaces in the generators are much greater than 16 mils, the one dimensional formulation can be applied to calculate generator resistance without introducing significant error.

The above estimates assume that $\eta/\mu$ is a constant, which is not true if ferromagnetic materials are used, or if one has very high fields which cause ohmic heating of the conductor. It will later become apparent that such high fields are encountered in many of the applications of the present invention. This nonlinear diffusion problem has been solved in one special case ("Nonlinear Diffusion of Strong Magnetic Fields into a Conducting Half-Space", by Ray E. Kidder, UCRL-5467; available from Technical Information Division of the University of California Lawrence Radiation Laboratory, Livermore, Calif.) where $\eta/\mu$ is assumed to be proportional to the absolute temperature, and where $B=O$ for $t<O$, $B=B_o$ at the surface of the conductor for $t \geq O$. One can interpret the solution in terms of "depth of penetration" $\Delta$, where $$\Delta = \delta \sqrt{1 + 0.28 \left(\frac{B^2}{2\mu}\right) \frac{1}{\rho C_v T_o}} \quad (8)$$

where $B^2/2\mu$ is the energy density of the magnetic field, and where $\rho C_v T_o$ is the heat stored in the copper at ambient temperature $T_o$. (The variations of specific heat $C_v$ with temperature have been neglected here.) The second term under the square root of Equation (8) is comparable to the first, when $$B = \sqrt{\frac{\mu \rho C_v T_o}{0.14}} \quad (9)$$

For copper, this is a magnetic field of about one megagauss. Thus, at high magnetic fields where the magnetic energy density becomes comparable to the stored thermal energy, the heating of a conductor for which $\eta/\mu$ is an increasing function of temperature T leads to a more rapid diffusion of magnetic field. It is to be noted that this is quite different from the diffusion of magnetic field through a plasma, where the heating leads to less rapid diffusion due to $\eta/\mu$ being a decreasing function of temperature.

GENERAL EXPRESSIONS FOR RESISTANCE AND INDUCTANCE

In view of the foregoing matter, the generator resistance $R_G$ can now be determined from the rate of magnetic diffusion into the wall. This has been done (see "Time-Dependent Behavior of Magnetic Fields Confined by Conducting Walls", by Ray E. Kidder, UCRL-5466 (1959) available from the Technical Information Division of the University of California Lawrence Radiation Laboratory, Livermore, Calif.) for the case of conducting systems of axial symmetry. The following will be a restatement of Kidder's result to make it applicable to any system whose dimensions are large compared to the skin depth, and for which the resistive heating can be neglected.

Since Equation (6) is mathematically equivalent to the equation of heat, it is logical to start with a well-known solution of that equation for the case of a semi-infinite solid (see H. S. Carslaw and J. C. Jaegar, "Conduction of Heat in Solids", 2nd Edition, Oxford, 1959, p. 63)

$$B = \frac{x}{2} \sqrt{\frac{\mu}{\pi \eta}} \int_o^t B_o(\lambda) \frac{e^{-x^2/4 \frac{\eta}{\mu} (t-\lambda)}}{(t-\lambda)^{3/2}} d\lambda \quad (10)$$

where $B_o$ is the value of B at $x=O$. If Equation (10) is integrated by parts, and then the gradient of B at $x=O$ is computed, one obtains $$\left[-\left(\frac{\partial B}{\partial x}\right)_{x=0}\right] = \sqrt{\frac{\mu}{\pi \eta}} \left(\frac{B_o(0)}{t^{\frac{1}{2}}} + \int_o^t \frac{B'_o(\lambda) d\lambda}{(t-\lambda)^{\frac{1}{2}}}\right) \quad (11)$$

where $B_o'(\lambda)$ is the x-derivative of $B_o(\lambda)$.

The magnitude h of Poynting vector $\overline{S}$ $$\overline{S} = \overline{\epsilon} \times \overline{H} = \overline{\epsilon} \times (\overline{B}/\mu) \quad (12)$$

at $x=O$ is found from Equations (5) and (12)

$$h_o = \eta/\mu J_o B_o \quad (13)$$

The following relations are now used $$J_o = \frac{1}{\mu}\left(\frac{\partial B}{\partial x}\right)_{x=0} \quad (14)$$

$$I = W \int_o^\infty J \, dx = \frac{W}{\mu} B_o$$

where W is a function of the geometry.

In the simplest case, that of a sheet-carrying current I, W would be the width of the sheet.

What is thus obtained is $$R_G = \frac{I^2 R_G}{I^2} = \frac{1}{I^2} \int_A h \, dA = \frac{1}{I} \int_A \left(\frac{\eta/\mu}{W} \frac{\partial B}{\partial x}\right) dA \quad (15)$$

Or, in words, the "resistive dissipation" in the circuit is the integral of the Poynting Vector over all conducting surfaces. Now, Equation (11) is substituted into (15)

$$R_G = \quad (16)$$

$$\frac{1}{I} \frac{1}{\sqrt{\mu}} \left[\int_A \frac{\sqrt{\eta \mu}}{W^2} dA\right] \left\{\frac{I(O)}{t^{\frac{1}{2}}} + \int_o^t \frac{I'(\lambda)}{(t-\lambda)^{\frac{1}{2}}} d\lambda\right\}$$

It should again be noted that this expression for the generator resistance $R_G$ is only valid for the case of no appreciable heating of the conductor. The more general case has not to our knowledge been solved.

The generator inductance $L_G$ is much easier to write down; it is obtained from the stored magnetic energy in the volume outside the conducting surfaces $$L_G = \frac{2}{I^2} \int_V \frac{B^2}{2\mu} dV = \frac{1}{\mu I^2} \int_V B^2 dV \tag{17}$$

Thus, $L_G$ can be found if the ratio $B/I$ is known throughout the volume.

Unfortunately, Equation (16) is not an easy expression to evaluate for those cases which can be compared with experiment. For geometries actually encountered (such as that shown in FIG. 1) the results of this fundamental approach do not allow each comparison with experiment. The fundamental approach, supra, certainly is the most illuminating as far as understanding the invention, but for practical purposes, the following approximations will best serve to evaluate experiments.

APPROXIMATE CALCULATION OF GENERATOR PERFORMANCE

In this approximation, it is assumed that for the magnetic field B at all times from $-\infty$ to t $$\dot{B} = aB \tag{18}$$

where a is a constant called the "time constant". This time behavior is rather closely followed in actual practice, as will be seen infra. Substituting (18) into (6) and solving for the field B(x,t) in the conductor $$B(x,t) = B_o(O)e^{at}e^{-x/\delta} \tag{19}$$

where $\delta = \sqrt{\eta/\mu a}$, and where $B_o(O)$ is the field at the surface at time zero. Next, the current density $J_o$ and the magnitude $h_o$ of the Poynting Vector at x=0 are written down, $$J_o(t) = \left[\frac{1}{\mu}\left(\frac{\partial B}{\partial x}\right)_{x=0}\right] = -\frac{1}{\mu\delta} B_o(t) \tag{20}$$

$$= -\sqrt{\frac{a}{\eta\mu}} B_o(t)$$

$$h_o = \frac{\eta}{\mu} J_o B_o = \eta \sqrt{\frac{\eta}{\mu a}} J_o^2 = \frac{1}{\mu}\sqrt{\frac{\eta a}{\mu}} B_o^2 \tag{21}$$

Substituting in Equations (15) and (17), and assuming that $\eta$ and $\mu$ are constants, it is found that $$\frac{R_G}{L_G} = \sqrt{\frac{\eta a}{\mu}} \frac{\int_A B^2 dA}{\int_V B^2 dV} \tag{22}$$

The geometry is now specialized even further, and the generator is approximated by means of a long solenoid as is shown in FIG. 1. If end effects are neglected, it can be written $$B = \mu n(z)I \tag{23}$$

where n(z) is the number of turns per meter, and is a function of z. Also obtained is $$dA = 2\pi(r_1 + r_2)dz \tag{24}$$

where the perturbations in the field introduced by the slots 41 (FIG. 2) between coils, are neglected; $r_1$ is the inside radius of the coil 11; and $r_2$ is the outside radius of the generator coil shown in FIG. 1. Similarly, $$dV = \pi(r_2^2 - r_1^2)dz \tag{25}$$

and for this case what is obtained, after cancellation, is $$\frac{R_G}{L_G} = \sqrt{\frac{\eta a}{\mu}} \frac{2}{r_2 - r_1} \equiv \sqrt{\Gamma a} \tag{26}$$

where the generator constant $\Gamma$ is defined in terms of this equation.

Now if the function n(z) is approximated by $$n = n_o e^{-kz} \tag{27}$$

it is seen that as the short circuiting cone (detonation front 37 of FIG. 2) moves with the detonation velocity $v_d$, the inductance $L_G$ (neglecting end effects) will vary as $$L_G = \mu\pi(r_2^2 - r_1^2) \int_{vt}^{\infty} n^2 dz \tag{28}$$

$$= \frac{\mu\pi}{2k}(r_2^2 - r_1^2) n_o^2 e^{-2kv_o t} \equiv L_o e^{-\beta t}$$

where $L_o$ and $\beta$ are defined by this equation.

Since I is proportional to B, Equation (23), we can say that $a = \dot{I}/I$. Then, referring back to Equation (2) and neglecting the load parameters $R_L$ and $L_L$, what is obtained is:

$$a = \beta - \sqrt{\Gamma a} \tag{29}$$

where $\beta = -\dot{L}_G/L_G$, as can be shown from Equation (28). This quadratic equation has the solution $$a = \beta + \frac{\Gamma}{2}(1 - \sqrt{1 + 4\beta/\Gamma}) \tag{30}$$

where the positive square root is rejected for the physical reason that $a \not> \beta$.

It is instructive to evaluate Equation (30) for the case of a copper generator, where $\eta = 1.7 \times 10^{-8}$ ohm-meters, $\mu = 4\pi \times 10^{-7}$, $r_2 = 1.25$ inches, and $r_1 = 0.75$ inches. One then finds $\Gamma = 347$ sec$^{-1}$. If the generator coil is made such that $k = 0.183$ inches$^{-1}$, then with a detonation velocity of $0.87 \times 10^6$ cm/sec, $\beta = 0.125 \times 10^6$ sec$^{-1}$, which is considerably greater than $\Gamma$. Using these parameters, one finds from Equation (29) that $a = 0.119 \times 10^6$ sec$^{-1}$, thus demonstrating quantitatively that resistance losses need not be prohibitive. This result is most important if the invention is to operate feasibly.

The above approximation contains a number of limitations which cannot be overlooked when analyzing the operation of the coil containing embodiment of the present invention. The following limitations, while important to keep in mind so as to understand any difference between actual and anticipated operation, are not to be construed as so severe as to limit the operability of the invention to ideal conditions which are impractical. The invention, as a matter of fact, is able to operate under the most adverse conditions with considerable success. First of all, it is evident that in actual practice, a will not be exactly constant. The initial current $I_o$ is provided by a condenser, and in a resonant LC circuit, a is not constant.

The second limitation is the neglect of end effects. In practice, radial B fields will exist and the approximation will be most untrustworthy when the detonation front 37 (FIG. 2) reaches the end of the coil.

The third limitation is due to flux loss which results from resistive heating at high current densities. This limitation will be small or great, depending upon the particular design of the generator (spacing of coil turns, etc.). Another heating effect resulting in flux loss is the heating of the moving armature 14 (FIG. 2) by shock and by the stretching motion as it expands.

A further limitation which manifests itself at about the same energy densities as for resistive heating, is the effect of the magnetic force per unit volume on the current carrying conductors. Such magnetic force acts in the outward direction during operation of the invention and may be represented by a hydrostatic pressure equal to the magnetic energy density. It is possible that while the armature expands out against the coil, pockets of magnetic energy may be trapped before being delivered to the load, contributing (resistive) losses.

Another limiting effect is contributed by voltage breakdown occurring somewhere in the generator, either turn-to-turn, or from armature to coil. In the generator of the present invention, the gas between the armature and the coil is being shocked rather than adiabatically compressed, but the velocity behind the shock front tends to approach the corresponding adiabatic case. Thus, the shock-heated gas is in a lower effective electric field due to its motion. If voltage breakdown should occur, field trapping effects (and losses) will occur.

Numerous designs of the basic invention, as described supra, have been built and operated. In one embodiment, the coil 11 was constructed with a variable pitch, as well as a constant pitch, and in another embodiment two sections were present; one of constant pitch and the other of variable pitch. The "variable pitch" generators were all designed to approximate, as nearly as was practicable, an exponential function for the pitch n(z), Equation (27).

Reference to FIG. 4 illustrates a modification of the invention, wherein there is substituted for the coil 11 of FIGS. 1 and 2, a conducting cylinder 42 which forms a coaxial transmission line in combination with the armature 14. Such coaxial transmission line embodiment is constructed essentially the same as the coil inductive type of generator of previous description. That is, there is provided an encompassing non-conducting solid plastic media 43 (whose only function in this case is to provide additional strength), and the armature 14 is provided with an inner plastic liner 44 that is packed with an explosive material 46. As mentioned supra, a helical coil is the most common manner of physically realizing an inductance, but the present invention is not restricted to that particular physical form and actually gains advantages by utilizing an alternate form such as the coaxial cylinders as shown supra. The chief advantage of such a coaxial transmission line embodiment is the elimination of turn-to-turn voltage breakdown which occurs in the coil inductive embodiment. That is, such a coaxial embodiment of the generator of the present invention allows the total elimination of possible arcing problems which do exist in the generator embodiment utilizing a coil as the source of inductance.

It is also evident, and should be mentioned, that essentially no part of the field will be lost when the armature sweeps down to the load end of the generator since all of the field produced in the transmission line is entrained between the armature (inner cylinder 14) and the outer cylinder 42 of the transmission line. Thus, nearly all of the energy in the magnetic field is gathered and delivered to the load. Some relatively small portion of the magnetic field energy is lost by diffusion of the magnetic field into the conductor itself.

The elimination of the above-mentioned losses by utilizing a coaxial transmission line as the inductive member of the system allows the output of such an embodiment to be approximately predicted by the use of the simple formula $$I = I_o(L_{Go}/L_G)$$

where I is the instantaneous output current, $I_o$ is the initial driving current (at time of detonation), $L_{Go}$ is the initial inductance of the generator and $L_G$ is the instantaneous value of generator inductance.

Another advantage of the coaxial generator, over the coil generator, is the large amount of available surface area over which a given current can flow. Due to this large surface area, current densities do not get as high and magnetic energy densities are also reduced. The reduced energy densities of the internal magnetic field are shown, infra, to allow the coaxial transmission line embodiment to have a much higher practical operating current level and output capability than the coil embodiment.

It must be pointed out that while the coaxial transmission line embodiment of the present invention has, inter alia, the advantages mentioned supra over the embodiment using a helical coil, numerous advantages of the coil embodiment over the coaxial embodiment do exist. The coil embodiment is capable of having larger initial generator inductances and can, therefore, be used to supply high inductive loads more efficiently. This high initial inductance also allows capacitor banks, with relatively large inherent inductance, to furnish the initial current, $I_o$. The coaxial generator requires an extremely low inductance drive source and if large initial currents are desired, capacitors may be unable to furnish the necessary current due to the inductive mismatch. Thus, it is seen that both embodiments present useful and advantageous devices.

Another embodiment of the invention is shown in FIG. 5. A coaxial transmission line composed of concentric cylinders 47 and 48 supply the generator inductance $L_G$. Inner cylinder 47 could be replaced by a helical coil and the coil would then supply the inductance. Operation is virtually the same which ever inductive member is used. Exterior of and circumjacent to outer cylinder 48 (the armature) is a cylinder of high explosives 49. The HE is covered by a metal sheet 51 to which connection flanges 52 and 53 are affixed.

The operation is quite similar to that of the embodiments utilizing an interior core of HE, in that a current is passed through the inductive member (the transmission line in this case) and when the current reaches a desired level, the HE is detonated. The embodiment of FIG. 5 is seen to present an implosion system. The force of the exploding HE causes outer cylinder 48 to be driven inward and contact inner cylinder 47 (or a coil if it were present). As the HE burns down the length of the generator, the inductance of the generator is reduced and a load connected between cylinder 47 and 48 (or cylinder 48 and a coil) will receive the electrical energy generated. It is clear that the cylinder 49 of HE requires a greater quantity of high explosives than the central core of HE used in the other embodiments, but, beyond this, little conceptual difference exists between the explosion and implosion systems.

Numerous loads have been used to receive the energy delivered in testing the present invention and no reason has been found for precluding any load from receiving energy from the present invention. The invention has been tested with one end shorted (a shortcircuit load) by a metal disc. The generator of the invention has also been used with a coaxial transmission line of varying inductances (varying lengths) as well as with a large single turn coil which established a 1.5 megagauss magnetic field. As mentioned supra, no specific load has been shown since the generator has general application and the load is not a dependent part of the structure of the invention.

Due to the occurrence of diffusion of the magnetic field within the coil of the generator into the metal coil during high level operation, and/or due to turn-to-turn voltage breakdown, a practical limit for output has been found for generators utilizing a coil (of now known metals) as an inductive member. This limit has been found by testing the invention and is found to exist when the coil field reaches approximately 2 megagauss.

type generator, a coil type generator of the present invention is used as the drive source. This allows high initial currents and energies to exist in the transmission line and its inductance at the time that the HE is detonated. Although a practical limit to the capabilities of a coil type generator have been found, no such limit has yet been found for the coaxial transmission line type generator.

As mentioned, supra, the output characteristics of the present invention are unique in that maximum values of current, voltage, and power exist simultaneously. This characteristic is illustrated in FIG. 6, which graphically depicts the current, power, and energy levels measured for one generator over the same period of time. The magnitudes that are shown on the graph do not represent the maximum or optimum values obtained but are presented more for purpose of illustration and to show the general range in which the generator of the present invention can operate. It is important to note that the maximum power between zero and 180 microseconds exists simultaneously with the maximum current achieved in the same range. This feature of the invention contributes heavily to the high efficiency with which the generator delivers energy.

The following Table I of experimental data illustrates some of the possible results that can be realized from the present invention. Table I is not to be taken as illustrating the maximum performance possible or as restraining the generator to the loads used. It is only presented as a guide to the relative values to be expected from operation of the present invention. Two examples of a coaxial transmission line embodiment are given, but they are early models and this should be kept in mind. Note should be taken that the currents are in kiloamperes and the energies are in kilojoules, while the inductances are in microhenries.

TABLE I

| | | \multicolumn{3}{c}{TEST RESULTS} | | | | |
|---|---|---|---|---|---|---|---|---|
| | | Currents (k amp) | | | | Energies (kilojoules) | | |
| Initial Inductance $L_{Go}$ (μh) | Load Inductance $L_L$ (μh) | Initial $I_o$ | Final $I_f$ | Ratio $I_f/I_o$ | Max. Observed I Max. | Initial $E_o$ | Final $E_f$ | Ratio $E_f/E_o$ |
| 75 | 0.06 | 14 | 1800 | 128 | 7000 | 7.3 | 100 | 14 |
| 75 | 0.06 | 24 | 1800 | 75 | 11000 | 21.7 | 100 | 4.6 |
| 75 | 0.06 | 25 | 3000 | 120 | 21000 | 23.4 | 270 | 11.5 |
| 75 | 0.06 | 0.175 | 34 | 194 | 300 | 0.00115 | 0.035 | 30 |
| 70 | 0.06 | 29 | 1500 | 52 | 10800 | 29.4 | 67.5 | 2.3 |
| 70 | 0.14 | 30 | 1400 | 47 | 1700 | 31 | 135 | 4.4 |
| 750 | 0.06 | 6 | 7000 | 1167 | 67000 | 13.5 | 1500 | 111 |
| 0.045 (Coax) | 0.015 | 1300 | 3700 | 2.8 | 9700 | 37 | 92 | 2.5 |
| 25 | 0.15 | 37 | 1100 | 30 | 1100 | 17 | 84 | 5.0 |

This magnetic field value corresponds to a magnetic energy density within the generator of approximately 16,000 joules/cc, an output current of approximately $300 \times 10^6$ amperes, and an output energy of approximately $1 \times 10^8$ joules. The time to deliver the energy to the load was approximately 100 microseconds. By changing the insulation materials and/or by speeding up the delivery time, outputs greater by at least a factor of 5 are anticipated.

The transmission line embodiment has a delivery time of about 6 microseconds and the latest models have outputs at least 10 times that described above. These generators (transmission line type) need extremely low inductive drive systems for high level operation and thus capacitor supplies have been found unsatisfactory. To allow high level operation with a transmission line The following data illustrate the physical and electrical parameters of two experimental generators whose output is shown in Table I, supra.

EXAMPLE I

| | |
|---|---|
| Overall Length | 4'3" |
| Number of Coil Turns | Approx. 65 (variable pitch) |
| Diameter of Armature | 2.5" |
| Diameter of Coil | 4.125" (inside diameter) |
| Initial Inductance | 75 μh |
| Type Explosives Used | PBX 9404 |
| Performance Results | First Line of Table I, supra |

-continued

| Initial Current Source | Capacitor Supply |

EXAMPLE II

| | |
|---|---|
| Overall Length | 6' |
| Number of Coil Turns | 12" at 6 turns/in. |
| | 6" at 3 turns/in. |
| | 6" at 1.5 turns/in. |
| | 6" at .75 turns/in. |
| | 6" at .375 turns/in. |
| | 6" at .1875 turns/in. |
| | (≃107 t) |
| Diameter of Armature | 6" |
| Diameter of Coil (ID) | 10.375" |
| Initial Inductance | 750 μh |
| Type Explosives Used | PBX 9404 |
| Performance Results | Line 7 of Table I |
| Initial Current Source | Capacitor Supply |

The uses to which the present invention can be put are virtually endless. As a replacement for standard electrical energy sources (capacitor banks, mainly) the present invention offers advantages in size, weight, cost, and capability. Due to the magnitudes at which the present invention can operate, utility is found in areas where electrical energy was previously not useful. The use of the present invention with radar and other communications media gives promise of extending many times the ability of man to see into the universe. Thus, the present invention is destined to replace many now existing energy sources, extend the capability of electrically driven devices now in use, and open an area of totally new uses of electrical energy previously thought beyond its capability.

While the present invention has been described with reference to but a limited number of embodiments, it will be appreciated by those familiar with the art that numerous extensions and modifications are possible, and the invention is therefore not to be limited by other than the following claims.

What is claimed is:

1. In an electrical energy generator, the combination comprising a first elongated annular electrical current conductor having at least one bare surface extending longitudinally and facing radially inwards therein, a second elongated annular electrical current conductor disposed coaxially within said first conductor and having an outer bare surface area extending longitudinally and facing said bare surface of said first conductor, the contiguous coaxial areas of said first and second conductors defining an inductive element, means for applying an electrical current to at least one of said conductors for generating a magnetic field encompassing said inductive element, and explosive charge means disposed concentrically with respect to said conductors including at least the area of said inductive element, said explosive charge means including means disposed to initiate an explosive wave front in said explosive advancing longitudinally along said inductive element, said wave front being effective to progressively deform at least one of said conductors to bring said bare surfaces thereof into electrically conductive contact to progressively reduce the inductance of the inductive element defined by said conductors and transferring explosive energy to said magnetic field effective to generate an electrical potential between undeformed portions of said conductors ahead of said explosive wave front.

2. An electrical energy generator as defined in claim 1 wherein said first annular conductor is a helical solenoidal coil with portions outward from said bare inner surface being embedded in a solid reinforcing insulating medium, and wherein said second conductor is an elongated annular conductor sleeve.

3. An electrical energy generator as defined in claim 1 wherein said first annular conductor is an elongated annular conductor sleeve, and said second conductor is a helical solenoidal coil.

4. An electrical energy generator as defined in claim 1 wherein said first and second conductors are elongated annular conductor sleeves.

5. In an electrical energy generator, the combination comprising a first elongated annular conductor having bare radially inward facing surfaces and portion radially outward therefrom encased and embedded in a reinforced solid plastic medium, a second elongated annular conductor disposed coaxially within said first conductor and having bare surface areas facing radially outwards in spaced relation and contiguous with respect to the bare surfaces of said first conductor, said conductors defining an inductive element in the region of said contiguous bare surfaces, means for applying an electrical current to at least one of said conductors for generating a magnetic field encompassing the inductive element of said conductors, and explosive means including a high explosive charge disposed concentrically within said second conductor at least in the region of contiguity of said surfaces, and detonator means associated with said charge for initiating an explosive wave front advancing axially within said second conductor, said wave front being effective to progressively expand said conductor to contact the bare surfaces of said conductors, thereby progressively reducing the inductance of the inductive element defined by said conductors and transferring energy to said magnetic field effective to generate an electrical potential between undeformed portions of said conductors ahead of said wave front, a liner of pliable non-conductor disposed between said explosive and the second conductor, and terminal means for connecting portions of said conductors ahead of said wave front to a load for delivering the electrical energy of said generated potential thereto.

6. In an electrical energy generator, the combination comprising a first annular conductor element including an elongated solenoidal winding encased and embedded in a solid non-conducting medium insulating turns from each other and encasing exterior portions of said winding, said winding having bare inner surfaces facing radially inward, a second elongated annular conductor element disposed coaxially within the solenoidal winding of said first conductor element having a bare outer surface disposed in spaced relation and contiguous to the bare inner surfaces of said solenoidal winding, said conductor elements defining an inductive element in the region of said contiguous surfaces, means for applying an electrical current to at least one of said conductors for generating a magnetic field encompassing the inductive element of said conductors, and explosive means including a high explosive charge disposed concentrically within said second conductor at least in the region of contiguity of said surfaces, and detonator means associated with said charge for initiating an explosive wave front advancing axially within said second conductor, said wave front being effective to progressively expand said conductor to contact the bare surfaces of said conductors, thereby progressively reducing the inductance of the inductive element defined by said conductors and transferring energy to said magnetic field effective to generate an electrical potential between undeformed portions of said conductors ahead of said wave front, a liner of pliable non-conductor disposed between said explosive and the second conductor, and terminal means for connecting portions of said conductors ahead of said wave front to a load for delivering the electrical energy of said generated potential thereto.

7. In an electrical energy generator, the combination comprising a first annular conductor element including an elongated annular conductor encased in a solid non-conducting medium insulating turns from each other and encasing exterior portions of said winding, said winding having bare inner surfaces facing radially inward, a second elongated annular conductor element disposed coaxially within the solenoidal winding of said first conductor element having a bare outer surface disposed in spaced relation and contiguous to the bare inner surfaces of said solenoidal winding, said conductor elements defining an inductive element in the region of said contiguous surfaces, means for applying an electrical current to at least one of said conductors for generating a magnetic field encompassing the inductive element of said conductors, and explosive means including a high explosive charge disposed concentrically within said second conductor at least in the region of contiguity of said surfaces, and detonator means associated with said charge for initiating an explosive wave front advancing axially within said second conductor, said wave front being effective to progressively expand said conductor to contact the bare surfaces of said conductors, thereby progressively reducing the inductance of the inductive element defined by said conductors and transferring energy to said magnetic field effective to generate an electrical potential between undeformed portions of said conductors ahead of said wave front, a liner of pliable non-conductor disposed between said explosive and the second conductor, and terminal means for connecting portions of said conductors ahead of said wave front to a load for delivering the electrical energy of said generated potential thereto.

8. In an electrical energy generator, the combination comprising a first annular conductor element including an elongated annular conductor encased in a solid non-conducting medium insulating turns from each other and encasing exterior portions of said winding, said winding having bare inner surfaces facing radially inward, a second elongated annular conductor element including an elongated solenoidal winding disposed coaxially within the solenoidal winding of said first conductor element having a bare outer surface disposed in spaced relation and contiguous to the bare inner surfaces of said solenoidal winding, said conductor elements defining an inductive element in the region of said contiguous surfaces, means for applying an electrical current to at least one of said conductors for generating a magnetic field encompassing the inductive element of said conductors, and explosive means including a high explosive charge disposed concentrically within said second conductor at least in the region of contiguity of said surfaces, and detonator means associated with said charge for initiating an explosive wave front advancing axially within said second conductor, said wave front being effective to progressively expand said conductor to contact the bare surfaces of said conductors, thereby progressively reducing the inductance of the inductive element defined by said conductors and transferring energy to said magnetic field effective to generate an electrical potential between undeformed portions of said conductors ahead of said wave front, a liner of pliable non-conductor disposed between said explosive and the second conductor, and terminal means for connecting portions of said conductors ahead of said wave front to a load for delivering the electrical energy of said generated potential thereto.

9. In an electrical energy generator, the combination comprising a first elongated annular conductor having bare radially inward facing surfaces and portion radially outward therefrom encased and embedded in a reinforced solid plastic medium, a second elongated annular conductor disposed coaxially within said first conductor and having bare surface areas facing radially outwards in spaced relation and contiguous with respect to the bare surfaces of said first conductor, said conductors defining an inductive element, in the region of said contiguous bare surfaces, means for applying an electrical current to at least terminals at one end of said conductors for generating a magnetic field encompassing the inductive element of said conductors and explosive means including a high explosive charge disposed concentrically within said second conductor at least in the region of contiguity of said surfaces, and detonator means associated with said charge at the end proximate said terminals of said conductors for initiating an explosive wave front advancing axially within said second conductor, said wave front being effective to progressively expand said conductor to contact the bare surfaces of said conductors, thereby progressively reducing the inductance of the inductive element defined by said conductors and transferring energy to said magnetic field effective to generate an electrical potential between undeformed portions of said conductors ahead of said wave front, a liner of pliable non-conductor disposed between said explosive and the second conductor, and terminal means for connecting portions of said conductors ahead of said wave front to a load for delivering the electrical energy of said generated potential thereto.

10. In an electrical energy generator, the combination comprising a non-conductor plate support member, a first elongated annular conductor element provided with electrical input and output terminals at opposite ends thereof including an electrical conductor extending between said terminals with radially outward portions embedded in a solid plastic medium and with bare surface portions facing radially inward, said element being rigidly supported by said plate member, a second elongated annular conductor element provided with electrical input and output members at opposite ends thereof rigidly supported upon said base member in coaxial alignment within said first element, said second element including a conductor extending between said terminals and having bare surface areas facing radially outward in contiguity to the bare surface areas of said first element conductor, with said input and output terminals being at corresponding ends of said elements, the conductors of said elements defining an inductive circuit element, a plastic liner disposed within said second annular element, explosive means including a high explosive charge disposed concentrically within the liner and in the second annular conductor element including a detonator disposed at the input terminal end of the conductor elements for initiating an explosive wave front advancing therefrom toward the output terminals of said conductors.

11. In an electrical energy generator, the combination comprising a non-conductor plate support member, a first elongated annular conductor element provided with electrical input and output terminals at opposite ends thereof including an electrical conductor extending between said terminals with radially outward portions embedded in a solid plastic medium and with bare surface portions facing radially inward, said element being rigidly supported by said plate member, a second elongated annular conductor element provided with electrical input and output members at opposite ends thereof rigidly supported upon said base member in coaxial alignment within said first element, said second element including a conductor extending between said terminals and having bare surface areas facing radially outward in contiguity to the bare surface areas of said first element conductor with said input and output terminals being at corresponding ends of said elements, the conductors of said elements defining an inductive circuit element, electrical current source means connected to said input terminals effective to establish a magnetic field encompassing said inductive element, and electrical load means attached to said output terminals, a plastic liner disposed within said second annular element, explosive means including a high explosive charge disposed concentrically within the liner and in the second annular conductor element including a detonator disposed at the input terminal end of the conductor elements for initiating an explosive wave front advancing therefrom toward the output terminals of said conductors, whereby said second element conductor is expanded and the bare surface areas are caused to progressively contact the bare surface areas of the first element conductor thereby progressively reducing the inductance of the inductive element defined by said conductors thereby transferring explosive energy to said magnetic field to generate electrical energy in conductor portions ahead of said wave front and deliver said energy to said load.

12. An electrical energy generator as defined in claim 11 wherein said first annular conductor is a helical solenoidal coil with portions outward from said bare inner surface being embedded in a solid reinforcing insulating medium, and wherein said second conductor is an elongated annular conductor sleeve.

13. An electrical energy generator as defined in claim 11 wherein said first annular conductor is an elongated annular conductor sleeve, and said second conductor is a helical solenoidal coil.

14. An electrical energy generator as defined in claim 11 wherein said first and second conductors are elongated annular conductor sleeves.

* * * * *